US011584812B2

(12) United States Patent
Nichols et al.

(10) Patent No.: US 11,584,812 B2
(45) Date of Patent: Feb. 21, 2023

(54) PLASTICS-BASED MANUFACTURED ARTICLE AND PROCESSES FOR FORMING SAID ARTICLE

(71) Applicant: Eovations, LLC, Grand Rapids, MI (US)

(72) Inventors: Kevin L. Nichols, Freeland, MI (US); Brett M. Birchmeier, Midland, MI (US)

(73) Assignee: Eovations, LLC, Grand Rapids, MI (US)

( * ) Notice: Subject to any disclaimer, the term of this patent is extended or adjusted under 35 U.S.C. 154(b) by 420 days.

(21) Appl. No.: 16/778,300

(22) Filed: Jan. 31, 2020

(65) Prior Publication Data

US 2020/0165365 A1 May 28, 2020

Related U.S. Application Data

(62) Division of application No. 14/452,779, filed on Aug. 6, 2014, now Pat. No. 10,577,442.

(60) Provisional application No. 61/863,657, filed on Aug. 8, 2013.

(51) Int. Cl.
*C08L 23/12* (2006.01)
*C08L 23/10* (2006.01)
*B29C 55/30* (2006.01)
*C08F 110/06* (2006.01)
*B27N 7/00* (2006.01)
*B27N 3/04* (2006.01)
*B27N 3/14* (2006.01)
*C08K 3/26* (2006.01)
*C08K 3/34* (2006.01)
*C08L 23/06* (2006.01)
*B29C 55/00* (2006.01)
*C08J 9/04* (2006.01)
*B29K 105/16* (2006.01)
*B29K 23/00* (2006.01)
*B29L 31/10* (2006.01)

(52) U.S. Cl.
CPC ............. *C08F 110/06* (2013.01); *B27N 3/04* (2013.01); *B27N 3/143* (2013.01); *B27N 7/00* (2013.01); *B29C 55/005* (2013.01); *B29C 55/30* (2013.01); *C08J 9/04* (2013.01); *C08K 3/26* (2013.01); *C08K 3/346* (2013.01); *C08L 23/06* (2013.01); *C08L 23/12* (2013.01); *B29K 2023/12* (2013.01); *B29K 2105/16* (2013.01); *B29K 2995/005* (2013.01); *B29L 2031/10* (2013.01); *C08J 2323/12* (2013.01); *C08K 2003/265* (2013.01)

(58) Field of Classification Search
CPC ... C08L 23/10; C08L 23/12; C08K 2003/265; C08K 3/34; B29C 55/30; B29C 55/00; B29C 55/0005
See application file for complete search history.

(56) References Cited

U.S. PATENT DOCUMENTS

| | | | |
|---|---|---|---|
| 2,517,570 A | 8/1950 | Irons | |
| 2,540,986 A | 2/1951 | Walter et al. | |
| 4,610,900 A | 9/1986 | Nishibori | |
| 4,663,860 A | 5/1987 | Beall | |
| 5,093,064 A | 3/1992 | Utsumi et al. | |
| 5,474,722 A | 12/1995 | Woodhams | |
| 5,547,631 A | 8/1996 | Mero et al. | |
| 6,086,982 A | 7/2000 | Peiffer et al. | |
| 6,939,496 B2 | 9/2005 | Maine et al. | |
| 7,687,002 B2 | 3/2010 | Nichols et al. | |
| 7,824,756 B2 | 11/2010 | O'Brien et al. | |
| 8,142,697 B2* | 3/2012 | Nichols | C08K 3/34 264/177.2 |
| 8,658,732 B2 | 2/2014 | Nichols et al. | |
| 8,871,130 B2* | 10/2014 | Nichols | B29C 55/30 264/330 |
| 9,731,447 B2* | 8/2017 | Benjamin | B29C 48/395 |
| 10,526,477 B2* | 1/2020 | Birchmeier | C08K 3/34 |
| 2002/0155279 A1 | 10/2002 | Dai et al. | |
| 2003/0224147 A1 | 12/2003 | Maine et al. | |
| 2004/0001940 A1* | 1/2004 | Neogi | B29C 70/52 428/292.1 |
| 2005/0171246 A1 | 8/2005 | Maine et al. | |

(Continued)

FOREIGN PATENT DOCUMENTS

EP 0700773 A2 3/1996
EP 1859916 A1 11/2007
(Continued)

OTHER PUBLICATIONS

SPI/SPD Technical Committee, A Guideline for a Test Method for Orientation of Plastic Sheeting by Means of a Hot Air Oven, Aug. 16, 2001, Washington, D.C., 7 pages.
Sung Ran Hong, International Search Report, dated Nov. 26, 2014, 3 pages, Republic of Korea.
Schoukens G et al, "Shrinkage behaviour of uniaxially drawn poly(ethylene 2,6-naphthalate) films", Polymer 40, 1999, pp. 3753-3761, Elsevier Science Publishers B.V., GB.
European Search Report dated Feb. 15, 2017, 7 pps.
(Continued)

*Primary Examiner* — Rip A Lee
(74) *Attorney, Agent, or Firm* — McGarry Bair PC

(57) ABSTRACT

An oriented polymer composition (OPC) article comprising a body having a length, which is greater than any perpendicular dimension, comprised of an OPC having a softening temperature, the body having an outer surface extending the length of the body, having polymer strands aligned in the lengthwise direction of the body, wherein the length dimension stability is greater than 99% when tested by heating the article for 24 hours at temperatures at least up to and including 71 degrees Celsius after completion of the manufacture of the article and processes for forming said article.

18 Claims, No Drawings

(56) References Cited

U.S. PATENT DOCUMENTS

| | | |
|---|---|---|
| 2008/0111278 A1 | 5/2008 | Nichols et al. |
| 2008/0287576 A1 | 11/2008 | Nichols et al. |
| 2009/0036667 A1 | 2/2009 | Kiyokazu et al. |
| 2012/0100355 A1 | 4/2012 | Pham et al. |
| 2012/0121879 A1 | 5/2012 | Nichols et al. |

FOREIGN PATENT DOCUMENTS

| | | |
|---|---|---|
| WO | 92/18318 A1 | 10/1992 |
| WO | 2010083063 A2 | 7/2010 |
| WO | 2013003490 A1 | 1/2013 |

OTHER PUBLICATIONS

Hitt, David, and Marianne Gilbert, "Dimensional Stability of Oriented, Rigid, Poly(Vinyl Chloride)." Journal of Applied Polymer Sciences, vol. 89, 2003, pp. 3859-3867. (Year: 2003).

"Standard Sizes: Thickness, Widths and Lengths." Wood Products. N.p., Dec. 9, 2013. Web.

McKeen, Laurence W.. (2008) Effect of Temperature and Other Factors on Plastics and Elastomers (2nd Edition)—1.1.5 Thermosets vs. Thermoplastics. William Andrew Publishing/Plastics Design Library. https://app.knovel.com/hotlink/pds/id:kt005129W2/effect-temperature-other/crystalline-vs-amorphous (Year: 2008).

Burdick, Donald L. Leffler, William L..(2010). Petrochemicals in Nontechnical Language (4th Edition)—26.2 Classifying Polymers. PennWell. Retrieved from: https://app.knovel.com/hotlink/pds/id:kt00C5L4F2/petrochemicals-in-nontechnical/classifying-polymers (Year: 2010).

* cited by examiner

PLASTICS-BASED MANUFACTURED ARTICLE AND PROCESSES FOR FORMING SAID ARTICLE

CROSS-REFERENCE TO RELATED APPLICATIONS

This application is a divisional of U.S. application Ser. No. 14/452,779, filed Aug. 6, 2014, now U.S. Pat. No. 10,577,442, which claims the benefit of U.S. Provisional Patent Application No. 61/863,657, filed Aug. 8, 2013, all of which are incorporated herein by reference in their entirety.

TECHNICAL FIELD

The embodiments of the invention relate to oriented plastic articles, particularly to oriented plastic composite article. In some aspects, the embodiments of the invention further relate to building products for exterior building applications and to processes for making such products.

BACKGROUND

Wood and wood substitute materials can serve as exterior cladding, decking, trim pieces, fencing and the like and can be found on exposed areas around the exterior of building structures. Many consumers find wood cladding, decking trim and fencing to be highly desirable from an aesthetic standpoint, but often select alternative products (e.g., wood plastic composite decking, steel siding, vinyl siding and fencing, or molded plastic or press-formed cementitious sheathing products) due to their lower initial cost, ease of maintenance, and perceived longevity when compared to wood. In addition to their relative high cost, wood products are prone to splitting, mildewing and rotting over time as a result of being exposed to prolonged moisture (rain, snow, high humidity) and excessive or insufficient sun conditions.

Known commercial synthetic products, including fiber cement products and extruded plastic products, particularly polyvinyl chloride siding (commonly referred to as vinyl siding) which are made to mimic wood in a variety of applications and designs, have achieved reasonable market success. However, they still lack the authenticity of real wood siding, decking, fencing and similar products, particularly, for decking and cedar clapboard siding. The synthetic wood substitute materials are exposed to moisture and sunlight and can be altered by them. For example, vinyl siding, as a result of its expansion and contraction during daily thermal cycles is not typically fastened directly to the building structure, but rather must be hung and the ends of adjacent pieces overlapped, in order to avoid distortion of the siding or unsightly gaps between adjacent pieces. However, even with these precautions, permanent damage to vinyl siding can occur as the result of temperature increases from solar irradiation, which depend on siding color, reflection from windows and the like and can achieve temperature increases above ambient of as much as 25° C. or more or even 40° C. or more.

Filled oriented plastic composites have been taught as wood substitute materials. These materials are made by extruding a filled thermoplastic to produce an extruded polymer composition, temperature conditioning and then drawing the polymer composition through a solid state drawing die at a drawing temperature to produce an oriented polymer composition (OPC). During the drawing process cavities are produced proximate the filler particles to produce an article of reduced density compared to the polymer composition prior to the drawing process. OPC articles are particularly suitable for cladding as they can have a coefficient of linear thermal expansion (CLTE) low enough for the OPC cladding to be directly fastened to a substrate and without overlapping the ends of adjacent pieces.

However, many highly oriented filled plastic composition articles can shrink in the board length direction, the direction in which the polymer composition is oriented during the drawing process, even at moderate temperatures. The reduction in length (shrinkage) can be a problem in storage before product sale or in end-use applications. Depending on the duration and temperature of exposure, shrinkage in the length direction of the article of as much as one percent, 2 percent, or even 3 percent or more is possible. Over days, weeks, or months, under some extreme conditions, shrinkage of 5 percent or more can be possible. Shrinkage during storage can lead to product being of length less than the nominal professed length; shrinkage of boards used for decking or cladding, as a result of solar heating can cause even greater board shrinkage which can lead to unsightly gaps between abutting boards.

BRIEF DESCRIPTION

An aspect of the present disclosure relates to a method of forming an oriented polymer composition (OPC) article comprising a drawn oriented polymer and having a body having a length dimension, a width dimension, and a thickness dimension in which the length dimension is greater than the width dimension and the width dimension is greater than the thickness dimension comprises treating a length of the OPC article at a stabilizing temperature for a stabilizing time sufficient to induce shrinkage of the body in the length dimension and subsequent to the treating, cooling the OPC article to ambient temperature to provide a length dimension stabilized OPC article. The length dimension stability of the length dimension stabilized OPC article is at least 99% when tested by heating the length dimension stabilized OPC article for 24 hours at temperatures at least up to and including 71 degrees Celsius.

In still another embodiment, a method of forming an oriented polymer composition (OPC) article comprises (a) providing a polymer composition comprising an oriented polymer; (b) conditioning the polymer composition to a drawing temperature that is 10 degrees Celsius or more below a softening temperature of the polymer composition; (c) drawing the conditioned polymer composition through a drawing die to form an OPC having a body having a length dimension, a width dimension, and a thickness dimension in which the length dimension is greater than the width dimension and the width dimension is greater than the thickness dimension; (d) treating the die drawn OPC at a stabilizing temperature for a stabilizing time sufficient to induce shrinkage of the body in the length dimension; and (e) cooling the treated OPC to ambient temperature to provide a length dimension stabilized OPC article. The length dimension stability of the length dimension stabilized OPC article is at least 99% when tested by heating the length dimension stabilized OPC article for 24 hours at temperatures at least up to and including 71 degrees Celsius.

The length dimension stable OPC articles of the invention can be used in any application in which a length dimensional plastic article is desirable. The length dimension stable OPC article of the invention is particularly useful for interior or exterior building applications and the articles of the invention are especially suited for exterior building applications. Non-limiting applications of the length dimension stable articles of the invention include decking, flooring, fencing, or cladding and other exterior applications such as molding or trim pieces.

DETAILED DESCRIPTION

Terms

"Solid state" refers to a polymer (or polymer composition) that is below the softening temperature of the polymer (or polymer composition). Hence, "solid state drawing" refers to drawing a polymer or polymer composition that is below the softening temperature of the polymer (or polymer composition). "Solid state die drawing" refers to drawing a polymer or polymer composition that is below its softening temperature through a shaping die.

"Polymer composition" comprises at least one polymer component and can contain non-polymeric components. A "filled" polymer composition includes discontinuous additives, such as inorganic or organic fillers.

An "orientable polymer" is a polymer that can undergo induced molecular orientation by solid state deformation (for example, solid state drawing). An orientable polymer can be amorphous or semi-crystalline (semi-crystalline polymers have a melt temperature (Tm) and include those polymers known as "crystalline"). Desirable orientable polymers include semi-crystalline polymers, and in particular, linear polymers (polymers in which chain branching occurs in less than 1 of 1,000 polymer units). Semi-crystalline polymers can be particularly desirable because they can result in greater increase in strength and flexural modulus than amorphous polymer compositions. Semi-crystalline polymer compositions can result in 4-10 times greater increase in strength and flexural modulus upon orientation over amorphous polymer compositions.

An "orientable polymer phase" is a polymer phase that can undergo induced molecular orientation by solid state deformation (for example, solid state drawing). Typically, 75 wt % or more, even 90 wt % or more or 95 wt % or more of the polymers in the orientable polymer phase are orientable polymers based on total orientable polymer phase weight. All of the polymers in an orientable polymer phase can be orientable polymers. An orientable polymer phase may comprise one or more than one type of polymer and one or more than one type of orientable polymer.

"Oriented polymer composition article", "OPC" and "oriented polymer composition" are interchangeable and refer to an article made by orienting the polymers of a polymer composition. An oriented polymer composition comprises polymer molecules that have a higher degree of molecular orientation than that of a polymer composition extruded from a mixer.

"Weight-percent" and "wt %" are interchangeable and are relative to total polymer weight unless otherwise stated.

"Softening temperature" (Ts) for a polymer or polymer composition having as polymer components only one or more than one semi-crystalline polymer is the melting temperature for the continuous phase polymer in the polymer composition.

"Melting temperature" (Tm) for a semi-crystalline polymer is the temperature half-way through a crystalline-to-melt phase change as determined by differential scanning calorimetry (DSC) upon heating a crystallized polymer at a specific heating rate. Tm for a semi-crystalline polymer can be determined according to the DSC procedure in ASTM method E794-06. Tm for a combination of polymers, and for a filled polymer composition, can also be determined by DSC using the same test conditions in ASTM method E794-06. If the combination of polymers or filled polymer composition only contains miscible polymers and only one crystalline-to-melt phase change is evident in the a DSC curve, then Tm for the polymer combination or filled polymer composition is the temperature half-way through the phase change. If multiple crystalline-to-melt phase changes are evident in a DSC curve due to the presence of immiscible polymers, then Tm for the polymer combination or filled polymer composition is the Tm of the continuous phase polymer. If more than one polymer is continuous and they are not miscible, then the Tm for the polymer combination or filled polymer composition is the highest Tm of the continuous phase polymers. As used herein, Tm-X° C. refers to the melting temperature Tm minus some X° C. For example, Tm-60° C., refers to a temperature that is the melting temperature Tm of the material in degrees Celsius minus 60° C.

"Softening temperature" (Ts) for a polymer or polymer composition having as polymer components only one or more than one amorphous polymer is the glass transition temperature for the continuous phase of the polymer composition.

If the semi-crystalline and amorphous polymer phases are co-continuous, then the softening temperature of the combination is the lower softening temperature of the two phases. If the polymer composition contains a combination of semi-crystalline and amorphous polymers, the softening temperature of the polymer composition is the softening temperature of the continuous phase polymer of the polymer composition.

"Glass transition temperature" (Tg) for a polymer or polymer composition is the temperature half-way through a glass transition phase change as determined by DSC according to the procedure in ASTM method D3418-03. Tg for a combination of polymers and for a filled polymer composition can also be determined by DSC under the same test conditions in D3418-03. If the combination of polymer or filled polymer composition only contains miscible polymers and only one glass transition phase change is evident in the DSC curve, then Tg of the polymer combination or filled polymer composition is the temperature half-way through the phase change. If multiple glass transition phase changes are evident in a DSC curve due to the presence of immiscible amorphous polymers, then Tg for the polymer combination or filled polymer composition is the Tg of the continuous phase polymer. If more than one amorphous polymer is continuous and they are not miscible, then the Tg for the polymer composition or filled polymer composition is the highest Tg of the continuous phase polymers.

If the polymer composition contains a combination of semi-crystalline and amorphous polymers, the softening temperature of the polymer composition is the softening temperature of the continuous phase polymer or polymer composition.

"Drawing temperature" refers to the temperature of the polymer composition as it begins to undergo drawing in a solid state drawing die.

An artisan understands that a polymer composition typically has a variation in temperature through its cross section (that is, along a cross sectional dimension of the composition) during processing. Therefore, reference to temperature of a polymer composition refers to an average of the highest and lowest temperature along a cross sectional dimension of the polymer composition. The temperature at two different points along the polymer cross sectional dimension desirably differs by 10% or less, preferably 5% or less, more preferably 1% or less, most preferably by 0% from the average temperature of the highest and lowest temperature along the cross sectional dimension. The temperature can be measured in degrees Celsius (° C.) along a cross sectional dimension by inserting thermocouples to different points along the cross sectional dimension.

"Linear Draw Ratio" is a measure of how much a polymer composition elongates in a drawing direction (direction the composition is drawn) during a drawing process to form polymer strands or fibers. Linear draw ratio can be determined while processing by marking two points on a polymer composition spaced apart by a pre-orientated composition spacing and measuring how far apart those two points are after drawing to get an oriented composition spacing. The ratio of final spacing to initial spacing identifies the linear draw ratio.

An OPC is "similar" to another OPC if its composition is substantially the same as the other OPC in all respects except those noted in the context where the similar OPC is referenced. Compositions are substantially the same if they are the same within reasonable ranges of process reproducibility.

"ASTM" refers to ASTM International, formerly American Society for Testing and Materials; the year of the method is either designated by a hyphenated suffix in the method number or, in the absence of such a designation, is the most current year prior to the filing date of this application.

"Multiple" means at least two.

"And/or" means "and, or as an alternative."

Ranges include endpoints unless otherwise stated.

Temperatures are given in degrees Celsius, abbreviated as "C" unless otherwise stated.

Flexural modulus is measured according to ASTM method ASTM D-6109-05.

Density is measured according to ASTM method ASTM D-792-00.

"Coefficient of Linear Thermal Expansion" and CLTE are used interchangeably is the fractional change in length per degree of temperature change. CLTE is determined by increasing temperature a defined amount, determining the initial and final lengths of the product and calculating CLTE as:

$$CLTE=(\text{Initial length}-\text{final length})/\text{change in temperature} \quad \text{(Equation 1)}$$

"Length dimension stable" and "LDS" are interchangeable. A length dimension stable, or LDS, OPC article refers to an OPC article that retains greater than 99% or more of its length (the dimension in the direction of the oriented polymer strands of the article) upon heating in a temperature controlled oven to 71 degrees Celsius (160 degrees Fahrenheit) for 24 hours or more. Dimensional stability is expressed as the percent of the product length retained and calculated as:

$$\text{Dimensional stability (\%)}=100-[100*(\text{initial length}-\text{final length})/\text{initial length}] \quad \text{(Equation 2)}$$

wherein initial length and final length refer, respectively, to the length of the OPC article being tested before and after heating to 71° C. The temperature for testing for dimensional stability was selected based on extreme temperature changes that may be encountered by the articles when used in an outdoor setting. Temperature rise above ambient can be as great as 60-70° F. (33-39° C.) for a black surface and 25-30° F. (14-17° C.) for a white surface on south exposures in Golden Colorado, Colo., U.S.A. in winter (based on modeling). In summer, the temperature rise above ambient can be slightly less. With temperature extremes in some geographic locations, such as areas of Arizona, U.S.A., reaching upwards of 110° F. (43° C.), an article that is dimensionally stable at 160° F. (71° C.) is likely to remain dimensionally stable under most extreme climate and weather related conditions.

"Stabilizing time" and "stabilizing temperature" are respectively the time during which an OPC is heated in a heating chamber and the temperature of the heating chamber in which an OPC is heated to cause length dimension shrinkage of the article such that upon reheating, the article retains 99% or greater of its length. The stabilizing time and temperature are selected to give a desired amount of reduction in the length dimension during the length stabilization process in order to obtain a preferred length dimension stability of an OPC article without unacceptable deformation or change in other dimensions or in the shape of the article. The actual choice of stabilizing time and stabilizing temperature can depend on a variety of factors including those related to the available equipment, the type of process (continuous or semi-continuous), and the desired length dimension stability of the article.

The length dimension stable article can be any shape in which the length is greater than any perpendicular dimension. The cross-sections can be of a regular geometry or can differ from a regular geometric shape. Non-limiting exemplary shapes include lengths with cross sections that are simple geometric shapes such as a circle, an ellipsoid, a triangle, a rectangle, a trapezoid and the like and shapes that are generally circular, ellipsoidal, triangular, rectangular, trapezoidal and the like. One non-limiting example of a shape that is substantially rectangular is a molded article that has been machined according to any of the processes described in Provisional Application No. 61/826,120, filed May 22, 2013, entitled "Plastics-Based Manufactured Article," which is herein incorporated by reference in full.

When the length dimension stable OPC article cross section shape is rectangular or substantially rectangular, the length dimension stable OPC board ("LDS OPC board") can have a length L, a width W and a thickness T. The length dimension L is in the direction of drawing and of polymer orientation. The length dimension L is greater than the width dimension W, which in turn is greater than the thickness dimension T. The length L can be any suitable length and can often be from as little as 12 inches (30.5 cm) to 20 ft (610 cm) or more. Generally a cross section of the article has dimensions greater than 1.0 mm or more in each cross sectional direction. It can be preferable for the cross-sectional area to be greater than 4 cm$^2$ or more even 5 cm$^2$ or more and as much as 7 cm$^2$ or even 8 cm$^2$ or more. Often, the width W can be from about 0.25 inch (6 mm) to 20 inches (500 mm), and the thickness T can be from ⅛inch (3 mm) to 4 inches (100 mm). The LDS OPC board can be a generally rectangular shape or may be fabricated or formed, as is known in the art, into more complex shapes, for example by routering, molding and the like. The LDS OPC board can be used in any interior or exterior application. Non-limiting examples for which the LDS OPC articles are particularly suitable include siding, decking, trim, or fencing applications.

The minimum length dimension stability required in a particular application depends on the temperature reached by an article utilized in that application, the length of the article and the polymer composition softening temperature. Generally, as the temperatures achieved in use approaches the softening temperature Ts of the polymer forming the article, the desired length dimension stability increases. In addition, as the length of an article in use increases, the desired length dimension stability may also increase. The required minimum length dimension stability for an article can, but does not necessarily depend, on the geometric shape of the cross-section. It is believed that in most applications the required minimum length dimension stability does not depend on the geometry of the article cross-section.

It is unavoidable without undue cost, that after manufacture and before sale, product can be stored for significant lengths of times, several months or even a year or more, in a storage environment that can be as much as 35° C. or more or even as high as 50° C. or more depending on various factors, such as climate and geographic location, for example. If the product is stored uncovered outdoors it can reach 71° C. due to heat gain. When an OPC article is held at these temperatures for extended periods of time, for example, several months or more, significant reduction in length can occur, as much as 0.3%, or 0.5% or more. This is undesirable as products designed as wood replacement articles are typically sold as a nominal length which can range from as little as 6 feet (1.83 meters) or less and can be as long as 20 ft (6.1 meters) or more for some applications. It is generally unsatisfactory for the purchaser of an article of a nominal length to find that the article, as a result of storage, is reduced in length compared to the nominal length.

In construction, it is typical that the ends of abutting wood boards, for example in cladding or decking applications, have a small spacing between them as they are installed. Similarly, when trim boards are installed at corners, small gaps are present as a result of mitered joints or lap joints. It is preferable that the cladding boards or trim pieces do not expand, contract or change dimensions excessively during a single day, with the seasons or over even longer times. Expansion of the articles can lead to bowing of the cladding, decking, or trim pieces as a result of compressive forces from expansion. Contraction or shrinkage of the articles can lead to an increase in the size of the gaps between adjacent boards or trim pieces. A preferred material for these applications is, therefore, stable to dimensional changes with temperature, both temporary dimensional changes as a result of daily cycles, and permanent dimensional changes as a result of any permanent reduction in the length dimension of the material.

Permanent changes in dimension can cause permanent unsightly bowing of boards, or permanent gaps at joints between boards. When decking is installed, the length dimension stability has to be great enough so that undesirable bowing or warping of the deck boards does not occur as the result of any dimensional change. Length dimension stability of 99% or greater can prevent undesirable bowing or warping.

Typically, wood clapboard siding is fixed when installed so that abutting boards are as close as practical, or even touching. This is a more stringent criterion than that for decking installation. For cladding, gaps between abutting boards can be as large as several millimeters. However, this is aesthetically not preferred. More typical gaps are less than 1.5 mm, preferably less than 1 mm, or even less than 0.5 mm, or 0.25 mm. Clapboard siding boards can be as long as 12 feet (366 cm), 16 feet (488 cm) or even 20 feet (620 cm) in length or more. When a 6 ft (183 cm) length is used, for example, in short sections between windows on the same face of a building, if shrinkage of as little as 0.75% occurs (corresponding to a length dimension stability of 99.25%), a gap as large as 6.3 mm could be observed on each end of the length. If a 12 ft length board shrinks in its length direction as little as 0.5% (length dimension stability of 99.5%), a gap between boards can be as large as 18.2 mm. Such gaps can be aesthetically undesirable to consumers.

In order to avoid long term reduction in the length dimension during storage, aesthetically undesirable gaps in decking or siding applications or other flaws that can be caused by article dimensional change, it can be preferred to have length dimension stability greater than 99%, 99.25%, 99.5% or even more. For particularly long lengths for applications such as cladding, for example, for which lengths can be as great as 6.1 meters (20 feet), length dimension stability as high as 99.6%, 99.7%, 99.8% or even 99.9% or more can be preferred.

In an exemplary embodiment, the LDS OPC article of the invention can be made from an OPC comprising a continuous phase of one or more orientable polymers. Preferably, 90 wt % or more, and more preferably, 95 wt % or more of the polymers in the polymer composition are orientable polymers. Alternatively, all of the polymer in the polymer composition can be orientable.

An orientable polymer is a polymer that can undergo polymer alignment as described above. Orientable polymers can be amorphous or semi-crystalline. Herein, "semi-crystalline" and "crystalline" polymers interchangeably refer to polymers having a melt temperature (Tm). Preferable orientable polymers are one or more than one semi-crystalline polymer, particularly polyolefin polymers (polyolefins) which tend to readily undergo cavitation in combination with filler particles. While not wishing to be limited by any theory, polyolefins are believed to undergo cavitation in combination with filler particles because polyolefins are relatively non-polar and as such adhere poorly to filler particles. Linear polymers (that is, polymers in which chain branching occurs in less than 1 of 1,000 monomer units, such as linear low density polyethylene) are even more preferable.

Non-limiting examples of suitable orientable polymers include polymers and copolymers based on polystyrene, polycarbonate, polypropylene, polyethylene (for example, high density, very high density and ultra-high density polyethylene), polyvinyl chloride, polymethylpentane, polyamides, polyesters (for example, polyethylene terephthalate) and polyester-based polymers, polycarbonates, polyethylene oxide, polyoxymethylene, and combinations thereof. A first polymer is "based on" a second polymer if the first polymer comprises the second polymer. For example, a block copolymer is based on the polymers comprising the blocks. Preferred orientable polymers include polymers based on polyethylene and polypropylene, examples of which include linear polyethylene having Mw from 150,000 to 3,000,000 g/mol; especially from 300,000 to 1,500,000 g/mol, even from 750,000 to 1,500,000 g/mol.

Polypropylene (PP)-based polymers (that is, polymers based on PP) are one example of a preferred orientable polymer for use in the present invention. PP-based polymers generally have a lower density than other orientable polyolefin polymers and, therefore, facilitate lighter articles than other orientable polyolefin polymers. PP-based polymers also offer greater thermal stability than other orientable polyolefin polymers with a consequent higher use temperature. Therefore, PP-based polymers, can also form oriented articles having higher thermal stability than oriented articles of other polyolefin polymers. Suitable PP-based polymers include PP homopolymer; PP random copolymer (with ethylene or other alpha-olefin present from 0.1 to 15 percent by weight of monomers); and PP impact copolymers. PP obtained from either industrial or commercial recycle streams, including filled or reinforced recycled PP can be suitable for use and may comprise from 0 to 100% of the orientable polymer used in the orientable polymer composition. It is preferable to use a PP-based polymer that has a melt flow rate as determined according to ASTM D-1238-10, in grams per ten minutes, of greater than 0.2, more preferably greater than 0.5 or even more preferably greater than 1 while simultaneously being less than 12, preferably less than 8, more preferably less than 6 and still more preferably less than 4. It is also preferred to use a PP-based polymer that has 55 to 70%, preferably 55 to 65% crystallinity.

The OPC can further comprise inert filler, either organic filler, or inorganic filler. Cellulosic fillers such as wood fiber, wood powder and wood flour are organic fillers that are acceptable, but are less desirable in exterior applications than are inorganic fillers. Cellulosic materials can absorb moisture or degrade and turn gray in direct sunlight, and can, even within a polymer composition, be susceptible to color bleaching when exposed to the sun, and to decomposition, mold and mildew when exposed to humidity OPC materials free of organic fillers are particularly desirable because inorganic materials do not suffer from all of the handicaps of organic fillers. Inorganic fillers are either reactive or inert. Inert fillers can be more preferred than reactive fillers in order to achieve a stable polymer composition density. However, inorganic fillers are generally denser than organic fillers. For example, inert inorganic fillers for use in the present invention typically have a density of at least two grams per cubic centimeter. Therefore, polymer compositions comprising inorganic fillers typically contain more void volume than a polymer composition comprising the same volume of organic fillers in order to reach the same oriented polymer composition density.

Non-limiting examples of suitable inert inorganic fillers include talc, clay (for example, kaolin), magnesium hydroxides, aluminum hydroxides, dolomite, titanium dioxide, glass beads, silica, mica, metal fillers, feldspar, Wollastonite, glass fibers, metal fibers, boron fibers, carbon black, nano-fillers, calcium carbonate, and fly ash. Particularly desirable inert inorganic fillers include talc, calcium carbonate, and clay. The inorganic filler can comprise one, or a combination of more than one, inorganic filler. More particularly, an inert inorganic filler can be any one inert inorganic filler or any combination of more than one inert inorganic filler.

PP can also comprise additives known in the art, non-limiting examples of which include pigments, colorants, stabilizers, both ultra-violet (UV) stabilizers and antioxidants, and fire retardant.

Solid state die drawing is different from extrusion (in which the material is pushed through a die in a hot, flowable state above the glass transition temperature Tg of the material) or even pultrusion (where the material can be both pushed and pulled). Solid state die drawing for making the LDS OPC articles involves pulling the material having a softening temperature Ts at a temperature below its melt temperature Tm through a drawing die via drive rollers, drive tracks, belts or similar devices so that the material is under a state of tension. The die drawing occurs at a drawing temperature Td below the polymer composition softening temperature Ts. The drawing temperature Td is generally ten or more degrees below the softening temperature, including 15, 20 or even 30 degrees or more below Ts, for example. Generally, the drawing temperature Td range is 40° C. or less below the polymer composition's Ts in order to use economically reasonable draw rates and to achieve a desirable void volume through cavitation in a polymer composition having all cross sectional dimensions greater than 1.0 mm. It is preferred to maintain the temperature of the polymer composition at a temperature within a range between the polymer composition's Ts and 50° C. below Ts inclusive of endpoints, while the polymer composition is drawn.

The drawing process causes the polymer chains of the material to elongate (or straighten) and generally align in the direction of drawing to yield a generally aligned fibrous polymer structure aligned in the drawing or length direction of the material. The individual polymer chains or groups of polymer chains can be somewhat tangled and also mechanically bonded to one another without deviating from the spirit of having the polymer strands generally aligned in the length wise direction of the article.

As noted herein above, fillers and additives can be incorporated with the orientable polymer to make an orientable polymer composition. Such fillers function as impediments to polymer chain alignment during solid state drawing and have the effect of introducing cavitation into the material and reducing density as the polymer chains are forced to slide past and detach from the particles during their elongation. The filler particles can vary in size, shape and selection (blends) to control the level and character of the cavitation. Other additives may include pigments, fire retardants, and other additives known in the art. Some of these fillers, such as fire retardants, may comprise hard particles and may have a beneficial dual purpose as both a fire retardant and as a portion of, or all, the filler constituent of the polymer composition.

The LDS OPC article can also include a coating on one or more of the exterior surfaces of the article. The coating can comprise any suitable material and can be applied prior to or subsequent to the length stabilization process used to provide a length dimensional stability to the OPC article. The coating may be selected so as to provide the OPC article with desired characteristics, non-limiting examples of which include improved performance in fire rating tests, scratch resistance, color, or other aesthetic characteristics. In some examples, the coating may be used to provide the OPC article with the desired characteristics without having to incorporate the material of the coating throughout the entire OPC article, which can provide cost savings when combining a coating made from a more expensive material with a core made from a less expensive material. The coating can be applied using any known process, non-limiting examples of which include extrusion coating and painting.

In an exemplary embodiment, the coating can be applied using an extrusion coating process that can occur before, during or after the solid state die drawing stage. If the coating process occurs before or during the solid state die drawing process, the applied coating thickness can be adjusted to account for thinning of the coating that may occur during the die drawing process. An exemplary coating includes a pigmented polypropylene-based material having a melt index suitable for use in an extrusion coating process. The coating may also include additional ingredients, such as fillers, colorants, stabilizers, etc.

In another example, the LDS OPC article may include a coating that is formed by heating a surface layer of the article to de-orient the surface layer, such as disclosed in U.S. Pat. No. 7,824,756, issued Nov. 2, 2010, the contents of which are incorporated herein by reference in its entirety. Briefly, the de-oriented surface layer described in U.S. Pat. No. 7,824,756 can be formed by providing a cavitated OPC and heating one or more surfaces of the OPC above the Ts of the OPC to de-orient the polymer on and proximate to the surface layer. A de-oriented surface layer is a layer that has experienced a reduction in polymer orientation. The OPC article can be treated such that a surface layer of the article has a lower degree of polymer orientation than a portion of the article adjacent the surface layer and closer to the center of the article. In one example, the process can involve drawing the polymer composition through solid state drawing die that is at or below the softening temperature of the polymer composition, to produce an oriented polymer composition according to any of the embodiments described herein or in U.S. Pat. No. 7,824,756. The polymer can be allowed to draw down in a free draw manner after exiting the solid state drawing die and the die drawn composition can be heated to generate a de-oriented surface layer having an orientation ratio value of 2 or less while the oriented polymer composition below the de-oriented surface layer has an average orientation ratio value of greater than 2. The orientation ratio can be determined as described in U.S. Pat. No. 7,824,756 using polarized micro-Raman spectroscopy and is a measure of orientation in the drawing direction relative to orientation in the thickness dimension for an OPC. The orientation ratio is a ratio of molecular orientation parallel to orientation direction relative to orientation perpendicular to the orientation direction. The surface de-orientation process can occur before, during or after the length stabilization process used to provide a length dimensional stability to the OPC article having a coating in the form of a de-oriented surface layer.

The density of the LDS OPC article can be any density that is suitable for the application. When no blowing agent or filler is present and there is no cavitation, the LDS OPC article density can be that of the oriented polymer matrix. When filler or blowing agent is present, the LDS OPC article density can be reduced as much as 10, 20, 30, 40, 50 or even 60% or more when the density is compared to that of an oriented article in the absence of void volume as the result of blowing agent or cavitation.

Generally, the extent of cavitation (that is, amount of void volume introduced due to cavity formation during orientation) is directly proportional to filler concentration. Increasing the concentration of inorganic filler increases the density of a polymer composition, but also tends to increase the amount of void volume resulting from cavitation in the oriented polymer composition. Particularly desirable embodiments of the present filled oriented polymer composition article have 25 volume-percent (vol %) or more, preferably 35 vol % or more, more preferably 45 vol % or more void volume and even 55 vol % or more based on total polymer composition volume. When inorganic fillers are used, the amount of filler is typically greater than 10%, more typically greater than 15% and even more typically greater than 20%. Particularly desirable embodiments of the present length dimension stabilized OPC comprise 25 wt % or more, 30 wt % or more, 35 wt % or more, or 40 wt % or more of inorganic fillers in order to have a preferred combination of density and flexural modulus. When the filler level is too high, the drawing process can become more difficult because the increased level of filler can lead to breaks in the OPC article during the drawing process and consequent process shut-downs. Thus, desirable embodiments generally comprise 65 wt % or less, preferably 60 wt % or less or even more preferably 55 wt % or less of filler.

Additional void volume may be created by the use of foaming agents, either exothermic or endothermic. Herein, "foaming agent" includes chemical blowing agents and decomposition products therefrom. Foaming agents include, but are not limited to moisture introduced as part of a filler, for example wood flour or clay, or by chemicals that decompose under the heating conditions of the billet extrusion process. Chemical blowing agents include the so-called "azo" expanding agents, certain hydrazide, semi-carbazide, and nitroso compounds, sodium hydrogen carbonate, sodium carbonate, ammonium hydrogen carbonate and ammonium carbonate, as well as mixtures of one or more of these with citric acid or a similar acid or acid derivative. Another suitable type of expanding agent is encapsulated within a polymeric shell. Blowing agent may be used up to at least 1.5 wt % blowing agent to achieve density reductions compared to an un-foamed billet of up to 20% or even more. The weight percent blowing agent is measured relative to total oriented polymer composition weight.

When LDS OPC articles which include an inorganic filler are produced for use as wood substitutes, it is preferred that their density be similar to or less than that of wood material, 1 g/cm$^3$ or less, preferably 0.9 g/cm$^3$ or less, more preferably 0.8 g/cm$^3$ or less, still more preferably 0.75 g/cm$^3$ or less, even more preferably 0.7 g/cm$^3$ or less and yet more preferably 0.65 g/cm$^3$ or less. When using inorganic filler, the density is typically greater than 0.5 g/cm$^3$ and more typically greater than 0.6 g/cm$^3$. Having a density similar to or less than that of wood can be desirable to facilitate ease of handling during shipping and use. In that regard, a lower density composition can be more desirable than a higher density composition provided that the lower density composition has sufficient stiffness. When wood flour is used as filler, density can be as low as 0.4 g/cm$^3$ and is generally 0.5 g/cm$^3$, or 0.6 g/cm$^3$ or more. The oriented polymer composition density can be measured according to American Society for Testing and Materials (ASTM) method D792.

To achieve a density of less than 1 g/cm$^3$ or less by cavitation and a modulus of 1.4 GPa (200,000 psi) the process must use a draw rate of 0.25 meter per minute (m/min) or faster. Desirably, the draw rate is 0.5 m/min or faster, preferably one m/min or faster, and more preferably two m/min or faster and may be 3 m/min or faster, 4 m/min or faster. An upper limit for the draw rate is limited primarily by the drawing force necessary to achieve a specific draw rate. The drawing force should be less than the tensile strength of the polymer composition at the drawing temperature in order to avoid fracturing the polymer composition. Typically, the draw rate is 30.5 meters per minute or slower, more typically 9 meters per minute or slower.

Increasing linear draw ratio, as a result of the increased orientation in the drawing or length direction, is one factor that increases the tendency of an oriented polymer composition to shrink in the length dimension when exposed to elevated temperatures. However, increasing linear draw ratio also results in a product with desirably greater stiffness (flexural modulus). And, increasing draw ratio and orientation when drawing a filled polymer composition to produce a filled OPC generally produces greater cavitation (hence, increased void volume).

A product with higher stiffness can make it easier for a worker to carry multiple boards of longer length without having them drag on the ground. Increased stiffness can also be a signal to the consumer of a higher quality product, especially when combined with a product with a density near to or less than that of wood. Stiffness of a polymer composition can also be important for meeting building codes for some applications of OPC articles. Preferred LDS OPC articles of the present invention have a flexural modulus of 1.4 gigapascals (GPa) (200,000 pounds per square inch (psi)) or greater, preferably 2.1 GPa (300,000 psi) or greater, more preferably 2.4 GPa (300,000 psi) or greater, still more preferably 2.8 GPa (400,000 psi) or greater, and even more preferably 3.5 GPa (500,000 psi) or greater in combination with a density of less than 0.9 g/cm$^3$. When the LDS OPC article is used as a deck board, a flexural modulus of 1.4 GPa or more is desirable to meet deck board code requirements requiring a board stiffness sufficient that the board demonstrates less than 0.09 inches deflection with 100 pounds per square foot weight evenly distributed over a 16 inch span. (see, for example, International Code Council-Evaluation Services (ICC-ES) requirement AC174 entitled: *Acceptance Criteria for Deck Board Ratings and Guardrail Systems*). Stiffness is measured as flexural modulus (modulus of elasticity) in accordance to ASTM method D-6109-05.

In one exemplary length stabilization process to produce a LDS OPC article, selected plastics materials and additives are introduced to an extruder as a pre-compounded material or as individual components, or as a combination of the two, and, after processing in the extruder, are extruded through a die and calibrator to produce a hot billet (extrudate) of the extruded material which is moved by a puller (caterpillars, belts, rollers, or other means) to a temperature conditioning stage, where the material is cooled below its softening temperature Ts. The cooled extrudate is then drawn through a solid state die draw stage through a die at a drawing temperature to align polymer chains in the lengthwise direction of drawing to produce an oriented polymer composition (OPC). Subsequently, the OPC is treated according to a length stabilization process. The length stabilization process can include transferring the OPC article to a length stabilizing unit operation. Optionally, after the drawing stage, the OPC can be cooled to a cutting temperature and cut to the desired length, and optionally surface deoriented and/or embossed prior to transferring to the length stabilizing unit operation. As used herein, cooling can refer to actively cooling an article or simply allowing the article to rest at ambient conditions until the temperature of the article reaches a desired, lower temperature.

The length stabilizing unit operation provides a heating chamber that is heated to a stabilizing temperature and in which the OPC resides for a stabilizing time. The stabilizing time and temperature are selected to give a desired amount of shrinkage during the length stabilization process in order to obtain a desired length dimension stability of an OPC article. The actual choice of stabilizing time and stabilizing temperature can depend on a variety of factors related to the available equipment, the type of process (continuous or semi-continuous), the material comprising the OPC, the dimensions of the OPC, the end use of the OPC article and the desired length dimensional stability of the article.

Low stabilizing temperatures can be chosen when process conditions permit a longer stabilizing time. A stabilizing temperature can be any temperature that provides a shrinkage as great as 1% or more during the length stabilization process and can be as low as 120° C., 100° C. or even lower, provided that the residence time in the heating chamber (stabilizing time) can be long enough to provide the desired shrink level and resultant length dimension stability. Generally, the stabilizing temperature is greater than 70° C., more preferably greater than 80° C., still more preferably greater than 90° C. and even more preferably greater than 100° C.

However, for the most economic use (e.g. high product throughput per unit of time and per unit of cost) of the equipment used for the length stabilization process, it is generally preferred to use shorter stabilizing times and higher stabilizing temperatures. It is generally preferable that the stabilizing temperature be greater than Tm-60° C., preferably greater than Tm-50° C., more preferably greater than Tm-40° C. and even more preferably greater than Tm-30° C. and can be greater than Tm-20° C. or even greater than Tm-10° C. The stabilizing temperature may even exceed the Tm of the polymer comprising the OPC and may be as high as 10° C. above the Tm. When the polymer comprising the OPC is a PP polymer of Tm of 160° C., the stabilizing temperature can be 160° C. or even 170° C. as long as the stabilizing time is sufficiently short so as to avoid actual melting or unacceptable deformation of the article. To avoid unacceptable deformation or changes in other than the length dimension of the article, it is generally preferable that the stabilizing temperature is less than the Tm of the polymer composition and generally more preferable that it be 10° C., 20° C., or even 30° C. less than the Tm of the polymer composition in order to maintain product stiffness and to reduce the possibility of dimensional change during the stabilization process in other than the length direction. When highly crystalline linear PP is used as the orientable polymer, it is preferable that the stabilizing temperature be less than 160° C., more preferably less than 150° C. and even more preferably less than 145° C. and even still more preferably less than 140° C. and yet more preferably less than 130° C.

The preferable stabilizing time chosen depends on the stabilizing temperature chosen and the reduction in length dimension desired to achieve a desired length dimension stability. The stabilizing time can be 3 minutes (min), 5 min or more. The stabilizing time can be 10 min, 20 min, 30 min, 40 min, 50 min, 60 min, or 70 min or more. The stabilizing time is preferably less than 120 min, preferably less than 90 min and still more preferably less than 75 min.

The heating chamber can be any geometry and any size as long as the OPC to be stabilized can reside in the chamber for the desired stabilizing time. Heating chambers known for food processing, for the drying of wood, and for other drying processes such as those known to chemical engineers can be adapted for use as a heating chamber for stabilizing an OPC article (For example, Chapter 20: "Solids Drying and Gas Solids Systems", *Perry's Chemical Engineers Handbook*, 6$^{th}$ Ed., McGraw-Hill, New York, N.Y., 1984, particularly the section on "Solids-Drying Equipment, pages 20-14 to 20-29). The heating chamber can be mounted horizontally or vertically and may be constructed in any configuration including configurations such that the entrance and exit are in close proximity relative to the overall length of the heating chamber.

The heating chamber is typically insulated on its exterior and provided with a heat source. Heat can be directly applied as from hot exhaust gases from a flame or indirectly through a fan blowing across a heated heat exchanger, for example. In one example, the heated gas is directed through a plenum and a gas distribution system, typically a metal plate with holes in an engineered pattern, to improve uniformity of gas flow and temperature distribution. The heating chamber can comprise one or more than one section or zone. Typically, in order to ensure that the product transiting the heating chamber reaches the desired stabilizing temperature, it is preferable to have multiple zones. The last section or sections before exiting the heating chamber can be one or more cooling zones. The heating chamber is typically constructed so as to discourage gas transfer between zones.

The heating chamber can be provided with a means to convey the OPC article from the heating chamber entrance to the heating chamber exit. Continuous operation may be realized by feeding articles continuously through heating chambers of sufficient length to obtain the required combination of stabilizing time and stabilizing temperature.

Boards may be pre-cut or still in the continuous ribbon made during the production process. The direction of travel of the board through the heating chamber may be in the direction of orientation, or cut boards may be fed perpendicular to the orientation direction through a wider heating chamber to minimize the overall length required of the heating chamber. Semi-continuous operation may be accomplished by first collecting a batch of boards followed by having them transit a suitable heating chamber.

Typically one of a variety of possible continuous conveyor systems is designed to transit the heating chamber with either fixedly attached or removably attached devices for carrying the OPC product. A "conveyor system" is a system that conveys, especially a mechanical apparatus that transports materials, packages, or items from one place to another and are especially useful in applications involving the transportation of heavy or bulky materials or transportation of materials through environments for which it is preferable that workers do not routinely enter. Many kinds of conveying systems are available, and can be used according to the requirements of the user. Useful conveyor systems include, but are not limited to belt conveyors, and chain conveyors those with enclosed tracks, towlines, and hand pushed trolleys. In the context of length dimension stabilizing an OPC, a conveying system can also mean lifting and moving devices used to push or pick up and move a movable truck or rack into a heating chamber used for a batch length dimension stabilizing operation. One such device, is a fork-lift which can be used on combination with a racking system or pallets.

The carrying devices can transit the chamber from the entrance end to the exit end at a rate suitable to give a desired residence time in the chamber (stabilizing time). The conveyor can move continuously or be moved stepwise (indexed) as newly loaded carrying devices are ready to transit the heating chamber. Possible carrying devices include trays, racks, cribs, trucks, carts and the like, and can carry a single OPC article, as with a "tray" or simple racking system, or multiple OPC articles. In either case, the carrying device can be designed to allow heat transfer from the heating medium to the OPC article either by gas flowing across the surface of the OPC article or by heat transfer from the carrying device directly to the OPC article. The carrying device can be designed to carry multiple articles stacked vertically, in which case, separating means between OPC articles are preferably provided.

Batch operation may be accomplished by collecting boards and placing them in a heating chamber and stabilizing them for the desired combination of stabilizing time and stabilizing temperature. After the stabilizing cycle is complete, the boards are removed from the heating chamber. In one non-limiting case a heating chamber for length dimension stabilizing OPC articles in a batch operation has a length of 48 feet, a height of 10 feet and a width of 10 feet and is fitted with movable racks that can be filled with OPC lengths prior to heating, moved into the heating chamber, the doors closed on the chamber and the lengths heated to a stabilizing temperature for a stabilizing time sufficient to produce a decrease in length of the OPC article. At the conclusion of the heating cycle, the racks holding the OPC articles are removed from the heating chamber and allowed to cool to ambient temperature to produce the LDS OPC product.

One example of equipment suitable for continuous operation is a vertical progressive conveyor having a plurality of racks, cribs, trucks or trays and the like, which can be filled with a unit of OPC lengths in which each unit is comprised of one or more vertically stacked layers of OPC lengths extending upwardly from a base and with each layer preferably separated by separating means to allow air-flow between successive layers, successively feeding so formed units of OPC to an in-feed station which is vertically spaced upwardly from a plurality of vertically stacked heating stations each of which holds one unit of OPC lengths and through which each unit of OPC lengths passes in its downward flow through the heating chamber with the unit above a lower unit having its base resting atop or proximate the upper surface of the lower unit when the heating chamber is filled with units of OPC lengths, heating the units of OPC articles to a stabilizing temperature within the heating stations, and successively removing a unit of OPC lengths from the lowermost heating station after it has been heated at the desired stabilizing temperature for a stabilizing time necessary to reduce the OPC article length at least 1.4% or more compared to the length of the OPC articles prior to the length stabilization process. In one example, the OPC lengths can be heated at a stabilizing temperature and time to reduce the OPC article length at least 2.0% or more compared to the length of the OPC articles prior to the length stabilization process. The equipment described above can have one fan, at least one gas plenum and gas distribution plate per zone and can have as many zones as desired.

EXAMPLES

The following examples illustrate embodiments of the present invention and not necessarily the full scope of the present invention.

An OPC can be prepared by feeding components together in a specific weight ratio either as individual components or in any combination of pre-compounded compositions to an extruder. The oriented polymer composition contains the formulations as included in Table 1 and the units are weight percent of total formulation, including the lubricant and additives and has a softening temperature Ts of approximately 163° C. The extruder heats and mixes the orientable polymer composition into a billet, which continues through a calibrator and cooling station to stabilize the billet dimensions. The billet is then thermally conditioned to a drawing temperature approximately 20° C. below the softening temperature of the orientable polymer composition.

TABLE 1

OPC formulations for both untreated/comparative examples and treated examples.

| Composition | PP Inspire 404* | Talc TC100* | Calcium carbonate* | Foaming Agent* | PE* | Lubricant * |
|---|---|---|---|---|---|---|
| A | 73 | 25 | 0 | 0 | 0 | 2 |
| B | 47.4 | 0 | 50.06 | 0.15 | 0.1 | 2.04 |
| C | 46.7 | 0 | 50 | 0.24 | 0 | 2.06 |
| D | 51.54 | 0 | 46 | 0.26 | 0.2 | 2 |
| E | 51.75 | 46 | 0 | 0.25 | 0 | 2 |
| F | 47.59 | 0 | 50 | 0.21 | 0.2 | 2 |
| G | 47.8 | 0 | 50 | 0.2 | 0 | 2 |
| H | 47.7 | 0 | 50 | 0.24 | 0 | 2.06 |
| I | 47.5 | 50 | 0 | 0.25 | 0.25 | 2 |
| J | 47.4 | 0 | 50.06 | 0.15 | 0.1 | 2.04 |
| K | 52 | 46 | 0 | 0 | 0 | 2 |
| L | 43 | 0 | 55 | 0 | 0 | 2 |
| M | 100 | 0 | 0 | 0 | 0 | 0 |

*Amounts listed are in weight-percent of the total composition.
Inspire D404 polypropylene (PP) is supplied by The Dow Chemical Co, Midland MI and has a Tm of 163° C.
Talc TC100 is supplied by Imerys, Societe Anonyme, Paris France.
Calcium carbonate grade #10 white, supplied by Imerys, Société Anonyme, Paris France.
Foaming agent is F-07 supplied by KibbeChem Inc, Elkhart Indiana.
PE—Polyethylene is grade Paxon EA55-003 from Exxon.
Lubricant is Baerlocher Baerolub W94112

The OPC composition is continuously pulled through a converging solid state drawing die using haul-offs to produce an OPC article. The OPC is drawn through the converging die at a drawing rate of between 6 and 20 feet per minute. The solid state drawing die has a shaping channel that converges to produce the OPC. The resulting OPC is cooled and cut into lengths using a cut-off saw. The untreated, comparative examples of Table 2 and the treated examples of Table 4 and Table 5 were prepared in this manner.

As comparative examples, a series of samples with the compositions A through K noted in Table 1 above were produced without being treated according to the length stabilization process. The length dimension stability was then determined by heating the OPC articles at 71° C. for 24 hours or more according to the method for determining length dimension stability described above for Equation 2 and the results are shown in Table 2. The examples were allowed to cool for at least 48 hours before the final length was recorded.

As illustrated in Table 2, the length dimension stability of the comparative/untreated examples CE1-CE11, that were not treated according to the length stabilization process exhibited length dimensional stabilities of less than 99%, which corresponds to a dimension length change of about 1% to over 3%, over a range of percent filler from 25% to 50%, density from 0.62 to 0.92, flexural modulus from 1.44 GPa to 9.15 GPa and board thickness from 0.6 cm to 2.7 cm (see Table 3). The linear draw ratio used to produce the comparative examples ranged from 2.5 to 9.5 (see Table 3). The length dimension change was determined in a manner similar to Equation 3 below based on the initial and final lengths.

Examples 1-18 of Table 4 below were prepared using the compositions A-K of Table 1 and then treated according to an exemplary length stabilization process. The exemplary length stabilization process included heating the OPC articles at 120° C. for times ranging from 30, 60 or 90 min over a three day period as follows:

1. Measure initial length of board.
2. Place the board in a 120° C. oven for a heating time of 30 min.
3. Remove the board from the oven and allow it to cool for 60 min.
4. Measure the length of the cooled board.
5. Measure the length of the cooled board again after 24 hrs of cooling.
6. Repeat the process of steps 2 through 5 for boards whose lengths were not the same after measurement in steps 3 and 4 until the article has reached a constant length.
7. Record the total heating time required to reach the constant length.

Subsequent to the length stabilization process, the examples were tested for length dimension stability by heating them at 71° C. for 48 hours, which is even longer than the comparative examples CE1-CE11 of Table 2 were heated, and is thus a more rigorous testing of the articles. The articles were cooled for 48 hours before their post testing length was recorded. The length dimension stability and shrink characteristics for the Examples 1-18 treated according to the exemplary length stabilization process described above are illustrated in Table 4. The thickness, draw ratio, density, and flexural modulus for the treated articles of Table 4 are the same as the untreated articles of the same composition in Table 2 and are illustrated in Table 3.

TABLE 2

Length dimension stability of comparative/untreated OPC Articles not treated according to the length stabilization process.

| Comparative/ Untreated Example No. | Composition* | Initial Length (cm) | Final Length (cm) | Length Dimension Change (%) | Length Dimension Stability (%) |
|---|---|---|---|---|---|
| CE1 | A | 369.25 | 364.49 | 1.29 | 98.71 |
| CE2 | B | 381.48 | 376.40 | 1.33 | 98.67 |
| CE3 | C | 377.03 | 371.16 | 1.56 | 98.44 |
| CE4 | D | 378.46 | 373.06 | 1.43 | 98.57 |
| CE5 | E | 377.19 | 370.05 | 1.89 | 98.11 |
| CE6 | F | 391.00 | 386.72 | 1.10 | 98.90 |
| CE7 | G | 378.30 | 369.89 | 2.22 | 97.78 |
| CE8 | H | 285.12 | 276.23 | 3.12 | 96.88 |
| CE9 | I | 285.12 | 276.86 | 2.90 | 97.10 |
| CE10 | J | — | — | ND | ND |
| CE11 | K | — | — | ND | ND |

*Refers to the Compositions shown in Table 1.
ND—Not Determined

TABLE 3

Characteristics of Comparative/Untreated Examples of Table 2 and Treated Examples of Table 4.

| Comparative/Untreated Example No. | Treated Example No. | Composition* | Board Thickness (cm) | Draw Ratio | Density (g/cm$^3$) | MOE** (GPa) |
|---|---|---|---|---|---|---|
| CE1 | 1-2 | A | 0.605 | 9.5 | 0.915 | 9.15 |
| CE2 | N/A | B | 0.94 | 9 | 0.69 | 3.21 |
| CE3 | 3-6 | C | 0.94 | 9 | 0.65 | 3.21 |
| CE4 | 7-8 | D | 1.98 | 8 | 0.68 | 3.59 |
| CE5 | 9-10 | E | 0.93 | 8.5 | 0.71 | 3.65 |
| CE6 | N/A | F | 2.72 | 7 | 0.62 | 2.45 |
| CE7 | 11-12 | G | 1.22 | 6.5 | 0.7 | 2.96 |
| CE8 | 13-14 | H | 2.6 | 2.5 | 0.83 | 1.44 |
| CE9 | 15-16 | I | 2.6 | 3.75 | 0.79 | 1.92 |
| CE10 | N/A | J | 0.86 | 9 | 0.69 | 3.62 |
| CE11 | 17-18 | K | 1.19 | 7 | 0.89 | 4.65 |

*Refers to the Compositions shown in Table 1.
**MOE is the same as flexural modulus as was determined by ASTM D-6109-05.

TABLE 4

Length dimension stability of OPC articles treated according to the length stabilization process.

| Treated Example No. | Composition from Table 1 | Initial Length* (cm) | Heating Time (min) | Final Length** (cm) | Shrinkage During Treatment*** (%) | Length Dimension Stability (%) |
|---|---|---|---|---|---|---|
| 1 | A | 368.9 | 90 | 355.6 | 3.61% | 99.96 |
| 2 | A | 369.1 | 30 | 356.6 | 3.40% | 99.91 |
| 3 | C | 377.0 | 60 | 359.1 | 4.76% | 100.00 |
| 4 | C | 377.3 | 60 | 358.3 | 5.05% | 99.96 |
| 5 | C | 377.0 | 60 | 357.2 | 5.26% | 99.96 |
| 6 | C | 377.0 | 60 | 358.5 | 4.93% | 99.96 |
| 7 | D | 378.6 | 90 | 364.2 | 3.82% | 100.00 |
| 8 | D | 378.5 | 60 | 365.8 | 3.36% | 99.91 |
| 9 | E | 376.2 | 60 | 357.3 | 5.02% | 99.96 |
| 10 | E | 376.6 | 60 | 357.5 | 5.06% | 100.00 |
| 11 | G | 378.5 | 60 | 355.6 | 6.04% | 99.96 |
| 12 | G | 378.8 | 90 | 356.2 | 5.95% | 99.96 |
| 13 | H | 284.2 | 60 | 266.7 | 6.15% | 99.88 |
| 14 | H | 285.0 | 30 | 268.6 | 5.74% | 99.65 |
| 15 | I | 279.6 | 60 | 266.4 | 4.71% | 100.00 |
| 16 | I | 281.8 | 60 | 266.7 | 5.35% | 99.94 |
| 17 | K | 372.3 | 90 | 362.4 | 2.64% | 100.00 |
| 18 | K | 372.0 | 60 | 363.5 | 2.26% | 100.00 |

*Before treatment according to the length stabilization process.
**After treatment according to the length stabilization process and before testing for length dimension stability.
***Percent shrinkage determined according to Equation 3 below.

As illustrated in Table 4, the length dimension stability of Examples 1-18 is greater than 99.5% over a range of percent filler from 25% to 50%, density from 0.62 to 0.92, flexural modulus from 1.44 GPa to 9.15 GPa and board thickness from 0.6 cm to 2.7 cm (see Table 3). The linear draw ratio used to produce the comparative examples ranged from 2.5 to 9.5 (See Table 3). This is in contrast to the length dimension stability of the untreated/comparative examples CE1-CE11 of Table 2 which only exhibited a length dimension stability in the range of 96.88-98.9% for OPC articles having the same composition and characteristics.

Table 5 illustrates the relationship between the length dimension stability of an OPC article treated according to the length stabilization process and the percent shrinkage during the treatment process and the stabilizing time and temperature. OPC articles of 7 mm thickness and width of 16 cm were produced using Composition J of Table 1 and were heated for various stabilizing times and stabilizing temperatures as shown in Table 5. The initial length of each article (LIB) is recorded and the article is placed in an oven maintained at the desired stabilizing temperature for the stabilizing time. The articles are removed from the oven and allowed to cool and the length of each heated length (LHB) is measured. The Percent Shrink (Shrink (%)) is determined as:

Percent Shrink (%)=100*(LIB−LHB)/LIB (Equation 3)

As illustrated in Table 5, the OPC articles when heated during treatment according to the length stabilization process exhibited a range of shrinkage from just over one percent to over 8%. The length dimension stability of these boards was subsequently determined following treatment according to the length stabilization process by heating at 71° C. for 24 or 48 hours (as indicated) according to the method for determining length dimension stability described above and calculated according to Equation 2. Table 5 illustrates the initial shrinkage as a result of heating the OPC articles according to the length stabilization process and the length dimension stability of the OPC articles so treated.

Table 5 illustrates the relationship between stabilizing time, temperature and shrinkage during treatment with the length dimension stability of the article. Example CE12 illustrates that for a given stabilizing temperature, as the stabilizing time and the shrinkage during treatment decreases, the length dimension stability of the article also decreases. As illustrated by the examples 19-38, the stabilizing time, temperature and shrinkage during treatment can be selected to provide a predetermined amount of treatment-induced shrinkage which can be correlated with a desired length dimension stability that is greater than 99%.

TABLE 5

Results of Heating OPC boards

| Example No. | Stabilizing Temp. (° C.) | Stabilizing Time (min) | Initial Length$^a$ (cm) | Final Length (cm) $^b$ 1 hr cool | Shrinkage During Treatment (%) | Length Dimension Stability (%) after 24 or 48 hrs at 71° C. |
|---|---|---|---|---|---|---|
| CE12 | 160 | 3 | 384.5 | 379.7 | 1.24% | 98.91* |
| 19 | 160 | 5 | 383.5 | 368.5 | 3.93% | 99.79* |
| 20 | 160 | 5 | 383.5 | 361.0 | 5.88% | 99.91* |
| 21 | 100 | 75 | 385.0 | 373.7 | 2.93% | 99.96 |
| 22 | 110 | 75 | 384.8 | 370.7 | 3.67% | 99.96 |
| 23 | 110 | 60 | 385.3 | 371.8 | 3.50% | 99.92 |
| 24 | 100 | 60 | 384.8 | 374.0 | 2.81% | 99.96 |

TABLE 5-continued

Results of Heating OPC boards

| Example No. | Stabilizing Temp. (° C.) | Stabilizing Time (min) | Initial Length$^a$ (cm) | Final Length (cm) $^b$ 1 hr cool | Shrinkage During Treatment (%) | Length Dimension Stability (%) after 24 or 48 hrs at 71° C. |
|---|---|---|---|---|---|---|
| 25 | 100 | 27 | 384.3 | 373.1 | 2.93% | 99.92 |
| 26 | 110 | 27 | 384.7 | 371.8 | 3.34% | 99.96* |
| 27 | 110 | 60 | 385.0 | 370.2 | 3.84% | 99.96 |
| 28 | 130 | 60 | 384.8 | 360.5 | 6.31% | 99.96* |
| 29 | 130 | 45 | 384.8 | 364.6 | 5.24% | 100.00* |
| 30 | 120 | 30 | 384.7 | 368.1 | 4.29% | 99.91* |
| 31 | 120 | 30 | 384.8 | 369.1 | 4.08% | 99.91* |
| 32 | 100 | 30 | 384.3 | 373.9 | 2.73% | 99.83* |
| 33 | 100 | 30 | 384.2 | 374.5 | 2.52% | 99.79 |
| 34 | 120 | 45 | 385.1 | 367.7 | 4.53% | 99.96 |
| 35 | 120 | 60 | 384.5 | 365.8 | 4.87% | 99.96 |
| 36 | 145 | 15 | 383.4 | 352.4 | 8.07% | 100.00* |
| 37 | 145 | 10 | 383.5 | 355.4 | 7.33% | 99.69* |
| 38 | 145 | 10 | 383.5 | 363.2 | 5.30% | 100.00* |

$^a$Before treatment according to the exemplary length dimension stabilization process.
$^b$After treatment according to the exemplary length dimension stabilization and before testing for length dimension stability.
*Heated for 48 hours instead of 24 hours.

The examples of Table 5, together with the examples of Table 4 exhibit stabilizing times as short as 5 minutes (min), or as long as 45 min, 60 min, 75 min, 90 min or longer. Because it is generally desirable for a process to be stable with respect to unavoidable minor changes in process conditions, it is preferable for the stabilizing time to be longer than 5 min, and for the stabilizing temperature to be less than Tm, or even 15° C. or more less than Tm. The results of Tables 4 and 5 illustrate that it is a combination of the stabilizing temperature and the stabilizing time that can provide the desired length dimension stability.

Furthermore, the examples of Table 5, together with the examples of Table 4 exhibit stabilizing temperatures over a range of from 100° C. to 160° C. that can provide length dimension stable OPC articles when the process for stabilizing the length of the articles includes a predetermined stabilizing time and a predetermined amount of shrinkage during treatment. The article shrinkage can be as much as 5, 6, 7, or even 8% compared to the length of the article prior to the heat stabilizing unit operation. The stabilizing time, temperature, and amount of shrinkage during the length stabilization process can be selected to provide an OPC articles having the desired degree of length stabilization and the desired final dimensions.

The length stabilization process can also be used with OPC articles having a coating (also sometimes referred to as a capped article). Table 6 illustrates the length dimension stability of exemplary capped OPC articles, Examples 39-43. Examples 39-43 were prepared using an OPC substrate of either composition D or H of Table 1 and then coated using either composition L or M in a melt extrusion process. The average thickness of the cap or coating layer was 0.81 mm (range of 0.68-0.97 mm), as determined by microscopy of cross-sections of the boards. X-ray profile densitometry indicates that the cap layer includes both the capping material and a portion of the melted substrate. The resulting capped board was treated according to the exemplary length stabilization process described above to provide a length dimension stabilized capped OPC article. The data in Table 6 is based on the average of three separate test boards for each treated example.

TABLE 6

Length dimension stability of capped OPC articles treated according to the length stabilization process.

| Treated Example No. | Substrate/ Cap Layer from Table 1 | Thickness* (cm) | Initial Length** (cm) | Heating Temp. (° C.)/Time (min.) | Final Length*** (cm) | Shrinkage During Treatment (%) | Length Dimension Stability (%) |
|---|---|---|---|---|---|---|---|
| 39 | H/L | 0.82 | 382.5 | 100/60 | 376.5 | 1.59 | 99.90 |
| 40 | H/L | 0.82 | 382.6 | 120/15 | 373.3 | 2.43 | 99.93 |
| 41 | D/M | 2.29 | 373.8 | 100/60 | 375.4 | 0.77 | 99.96 |
| 42 | D/M | 2.29 | 378.4 | 120/15 | 375.3 | 0.62 | 99.79 |

*Total thickness, including cap layer.
** Before treatment according to the exemplary length dimension stabilization process.
*** After treatment according to the exemplary length dimension stabilization process and before testing for length dimension stability.

The results of Table 6 illustrate that stabilizing time, temperature, and amount of shrinkage during the length stabilization process can be selected to provide a capped OPC article having the desired degree of length stabilization and the desired final dimensions in a manner similar to that described for the uncapped OPC articles.

The benefits of the invention can be appreciated by one skilled in the art with a real-world example of a backyard deck. In an illustrative example of a deck made from deck boards having a nominal length of 12 feet (144 inches) and forming a 144×144 inch square deck, shrinkage of the deck boards can be a problem, both structurally and aesthetically. In the comparative/untreated examples of Table 2 above in which the articles were not treated according the length stabilization process, the average dimension change as a result of the length dimension stability test could be as much as 2-3%. In the example of a deck made from 144 inch length boards, this could mean that the deck boards could shrink by as much as about 2.9-4.3 inches. Thus, a deck board that was originally a 144 inch length board could have a final length of about 139.7-141.1 inches. If the shrinkage occurs before the deck is constructed, this could result in components that are intended to fit with a 144 inch length board not being usable. If the shrinkage occurs after the deck is constructed, this shrinkage could result in unsightly gaps between boards and possibly unsafe and unstable connections and joints between components. In the context of a board having a nominal length of 16 feet (192 inches), such as a siding or trim board, this amount of shrinkage can result in boards that are intended to have a length of 192 inches, having a length of only 188 inches or even as low as 186 inches, resulting in a gap of almost 6 inches.

In contrast, articles treated according the length stabilization process described herein has a shrink rate of as little as 1% or less. This means that the actual length of a board, even taking into account shrinkage, will be close or even identical to the nominal length at which the board is sold. This minimal amount of shrinkage post-installation can provide tighter, safer and more stable connections and joints.

It is also a feature of this invention that the length stabilization treatment process can be used to provide boards that can have a final length that can be accurately predicted. For example, the length dimension stability for an article made from a predetermined composition and having predetermined characteristics (e.g. thickness, density, flexural modulus) can be used to reverse engineer how long the article should be made prior to treatment to result in an article having a desired final length. Thus, a board that is sold as having a nominal length of 144 inches can be prepared such that the actual final length, taking into account post-drawing shrinkage, is identical or nearly identical to the nominal length that the board is advertised as having. Therefore, it will be understood that a step of the inventive method is manufacturing a given article to be longer in one or more dimensions prior to application of the length stabilization treatment process according to this invention, which will result in an end product which is at or very close to a desired nominal dimension of the article.

The following clauses define additional aspects of the embodiments of the invention which are encompassed by the present disclosure.

According to one embodiment, an oriented polymer composition (OPC) article comprises a body having a length, which length is greater than any perpendicular dimension, comprising an OPC having a softening temperature, the body having an outer surface extending the length of the body, having polymer strands aligned in the lengthwise direction of the body, wherein the length dimension stability is greater than 99% when tested by heating the board for 24 hours at 71 degrees Celsius after completion of the manufacture of the article.

According to another embodiment, an OPC article comprises a body having a length greater than any perpendicular dimension, comprised of a filled oriented polymer composition, having a softening temperature, the body having an outer surface extending the length of the body, and having polymer strands aligned in the lengthwise direction of the body, wherein the length dimension stability is greater than 99% when tested by heating the board for 24 hours or more at 71 degrees Celsius after completion of the manufacture of the article.

In another embodiment, the invention is an OPC article having a length, a width and a thickness, wherein the length dimension is greater than the width dimension or thickness dimension and the width dimension is greater than the thickness dimension, wherein the article is comprised of an OPC comprising filler and having polymer strands aligned in the lengthwise direction of the body, wherein the length dimension stability is greater than 99% when tested by heating the OPC article for 24 hours or more at 71 degrees Celsius after completion of the manufacture of the article.

Additional embodiments of the length dimension stable OPC article include one or more of the following: the polymer composition comprises polypropylene or polyethylene; the polymer composition comprises additives and/or fillers wherein additives may include UV stabilizers, fire retardant additives, colorants or foaming agents; a polymer composition comprising inorganic filler; the polymer composition comprising an inorganic filler wherein the filler comprises from 25% to 60 wt % of the OPC article; and polymer composition comprises an inorganic filler, selected from talc or calcium carbonate, glass fiber, mica or wollastonite; the polymer composition comprises less than 3 percent blowing agent based on polymer composition weight; the length dimension stability is 99.5% or greater when tested by heating the OPC article for 24 hours at 71 degrees Celsius; a substantially rectangular article wherein the thickness dimension is greater than 3 mm or the width dimension is greater than 6 mm and less than 500 mm; the cross-sectional area is greater than 4 cm$^2$; a density less than 1.0 g/cm$^3$ and greater than 0.35 g/cm$^3$ a flexural modulus greater than 2.4 GPa; and an article comprising a coating.

In another embodiment, the invention is a method to produce a length dimension stable OPC article comprising the steps of exposing a length of drawn OPC article to a stabilizing temperature for a stabilizing time sufficient to cause shrinkage in the OPC article in the length dimension, and cooling said length dimension stabilized OPC article to ambient temperature.

Another embodiment of the process comprises a continuous process, in which the OPC article is made by a continuous process and length stabilizing is accomplished using a continuous conveying system which comprises the steps of:
  a) continuously providing one or more lengths of OPC article to an entrance of a heated chamber;
  b) heating the length of OPC to a stabilizing temperature;
  c) allowing the OPC length to reside in the heated chamber for a stabilizing time;
  d) conveying the OPC length from the heated chamber through an exit of the heated chamber; and
  e) cooling the OPC length to ambient temperature to produce a length dimension stabilized OPC article;
  wherein the combination of stabilizing time and stabilizing temperature are sufficient to cause a decrease in the length of the OPC article such that the OPC article has a length dimension stability of 99% or greater.

Another embodiment of the process for producing a length dimensional stable solid state drawn polymer composition comprises the steps:
  (a) providing a polymer composition comprising 25 weight-percent or more and 60 weight-percent or less of an inert inorganic filler based on polymer composition weight and a continuous phase of at least one orientable polymer, the polymer composition having a melt temperature and wherein the polymer composition comprises less than 3 weight-percent blowing agent based on polymer composition weight;

(b) conditioning the temperature of the polymer composition to a drawing temperature that is 10 degrees Celsius or more below the polymer composition's softening temperature;

(c) drawing the polymer composition through a drawing die at a drawing rate of at least 0.25 meters per minute to form an oriented polymer composition;

(d) optionally, cooling the oriented polymer composition after it exits the drawing die;

(e) cutting the oriented polymer composition to a desired length;

(f) heating the cut oriented polymer composition article at a stabilizing temperature for a stabilizing time sufficient to cause a length of the oriented polymer composition article to decrease, and (g) cooling the OPC length to ambient temperature to produce a length dimension stabilized OPC article.

Other embodiments of the process are selected from one or more of the following: the orientable polymer is selected from polypropylene-based polymers, polyethylene-based polymers, polyvinyl chloride and polyester-based polymers; the polymer composition comprises one or more fillers selected from a group consisting of talc, calcium carbonate, magnesium hydroxide, clay and fly ash; the stabilizing operation is accomplished by stabilizing a unit of OPC articles in batch-wise fashion; the OPC article is a generally rectangular product whose length is greater than either the width or thickness; the linear draw ratio of the OPC article prior to the stabilizing step is between 2.5 and 12.

In further embodiments, the stabilizing temperature of the heated chamber is less than the melt temperature Tm of the thermoplastic of which the OPC article is comprised, preferably greater than Tm-80° C., and more preferably greater than Tm-40° C. In another embodiment, the stabilizing temperature of the heated chamber is less than 10° C. above the melt temperature Tm of the thermoplastic of which the OPC article is comprised.

In another embodiment, the stabilizing time and temperature are sufficient to cause the length of the OPC article to decrease by 1% or more. In other embodiments, the stabilizing time and temperature are sufficient to cause the length of the OPC article to decrease by 2% or more or even 2.5% or more.

In yet another embodiment, the stabilizing time for which the OPC article is exposed to a stabilizing temperature is for a time of from 3 to 120 minutes, preferably 10 to 90 minutes and more preferably 10 to 60 minutes. In other embodiments, the stabilizing time is 5 to 120 minutes, preferably 5 to 90 min. and more preferably 5 to 60 minutes.

According to another embodiment, the stabilizing time can vary depending on the stabilizing temperature, the dimensions of the article, processing parameters, such as processing time, and the material used to form the OPC article in order to provide the OPC article with the desired length dimension stability. In still another embodiment, the stabilizing temperature can vary depending on the stabilizing time, the dimensions of the article, processing parameters, such heating temperature, and the material used to form the OPC article in order to provide the OPC article with the desired length dimension stability.

In another embodiment, the length dimension stabilization process is part of a batch operation.

To the extent not already described, the different features and structures of the various embodiments may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly disclosed.

While the invention has been specifically described in connection with certain specific embodiments thereof, it is to be understood that this is by way of illustration and not of limitation. Reasonable variation and modification are possible within the scope of the forgoing disclosure without departing from the spirit of the invention defined in the appended claims.

What is claimed is:

1. A method of forming a length dimension stabilized oriented polymer composition (OPC) article comprising a body having a length dimension, a width dimension, and a thickness dimension in which the length dimension is greater than the width dimension and the width dimension is greater than the thickness dimension, the method comprising:

treating a length of an OPC article at a stabilizing temperature for a stabilizing time sufficient to induce shrinkage of the body in the length dimension, wherein the OPC article comprises polypropylene-based polymer strands of an oriented polymer composition that are aligned with the length dimension of the body and wherein the body is a solid state die drawn body; and subsequent to the treating, cooling the OPC article to ambient temperature to provide a length dimension stabilized OPC article wherein a length dimension stability of the length dimension stabilized OPC article is at least 99% when tested by heating the length dimension stabilized OPC article for 24 hours at temperatures at least and including 71 degrees Celsius.

2. The method of claim 1 wherein the stabilizing temperature is within a range of 80 degrees Celsius below a melting temperature of the oriented polymer composition and 10 degrees Celsius above the melting temperature of the oriented polymer composition.

3. The method of claim 1 wherein the stabilizing time is within a range of 3 to 120 minutes.

4. The method of claim 1 wherein the oriented polymer composition further comprises at least one of polypropylene or recycled polypropylene and a melt flow rate of the at least one of polypropylene or recycled polypropylene is less than 6 and greater than 0.5 grams per 10 minutes as determined by ASTM D-1238-10.

5. The method of claim 1 wherein the stabilizing time and stabilizing temperature induce a 1% shrinkage of the body in the length dimension.

6. The method of claim 1 wherein the body has a thickness dimension in range of 3 mm to 100 mm.

7. The method of claim 1 wherein the OPC article further comprises 25 weight-percent or more and 60 weight-percent or less of a filler.

8. The method of claim 7 wherein the filler is selected from the group comprising talc, calcium carbonate, magnesium hydroxide, clay, wollastonite, fly ash, and combinations thereof.

9. The method of claim 1 wherein the length dimension stabilized OPC article has a density of less than 1.0 grams per cubic centimeter according to ASTM method 792-00 and a flexural modulus of 1.4 gigaPascals (200,000 pounds per square inch) or more according to ASTM method D-6109-05.

10. The method of claim 1, further comprising coating at least one surface of the body.

11. A method of forming a length dimension stabilized oriented polymer composition (OPC) article, the method comprising:
(a) providing a polymer composition comprising an oriented polypropylene-based polymer;
(b) conditioning the polymer composition to a drawing temperature that is 10 degrees Celsius or more below a softening temperature of the polymer composition to form a conditioned polymer composition;
(c) drawing the conditioned polymer composition through a drawing die to form an OPC having a solid state die drawn body defining a body having a length dimension, a width dimension, and a thickness dimension in which length dimension is greater than the width dimension and the width dimension is greater than the thickness dimension;
(d) treating the OPC having the solid state die drawn body at a stabilizing temperature for a stabilizing time sufficient to induce shrinkage of the body in the length dimension to form a treated OPC; and
(e) cooling the treated OPC to ambient temperature to provide a length dimension stabilized OPC article wherein a length dimension stability of the length dimension stabilized OPC article is at least 99% when tested by heating the length dimension stabilized OPC article for 24 hours at temperatures at least and including 71 degrees Celsius.

12. The method of claim 11, further comprising applying a coating to the treated OPC.

13. The method of claim 11 wherein the stabilizing temperature is within a range of 80 degrees Celsius below a melting temperature of the OPC and 10 degrees Celsius above the melting temperature of the OPC.

14. The method of claim 11 wherein the stabilizing time is within a range of 3 to 120 minutes.

15. The method of claim 11 wherein the stabilizing time and temperature induce a 1% shrinkage of the body in the length dimension.

16. The method of claim 11, further comprising cooling the OPC having the solid state die drawn body after the OPC having the solid state die drawn body exits the drawing die.

17. The method of claim 11 wherein a linear draw ratio during the drawing of the conditioned polymer composition is within a range of 2.5-12.

18. A method of forming a plurality of length dimension stabilized oriented polymer composition (OPC) articles, each comprising a body having a length dimension, a width dimension, and a thickness dimension in which the length dimension is greater than the width dimension and the width dimension is greater than the thickness dimension, the method comprising:
continuously providing a plurality of lengths of OPC articles to a heating chamber, treating the plurality of lengths of the OPC articles at a stabilizing temperature for a stabilizing time sufficient to induce shrinkage of each of the plurality of lengths of the OPC articles in the length dimension, wherein each of the plurality of lengths of the OPC articles comprises polypropylene-based polymer strands of an oriented polymer composition that are aligned with the length dimension of the body and wherein the body is a solid state die drawn body;
conveying the plurality of lengths of the OPC articles from the heating chamber to a cooling zone; and
cooling the plurality of lengths of the OPC articles in the cooling zone to ambient temperature to provide the plurality length dimension stabilized OPC articles wherein a length dimension stability of each of the plurality of length dimension stabilized OPC articles is at least 99% when tested by heating a plurality of length dimension stabilized OPC articles for 24 hours at temperatures at least and including 71 degrees Celsius.

* * * * *